United States Patent

Heitman et al.

Patent Number: 5,449,112
Date of Patent: Sep. 12, 1995

[54] METHOD AND APPARATUS FOR MONITORING AND CONTROLLING AIR HANDLING SYSTEMS

[76] Inventors: Lynn B. Heitman, 4711 Sycamore La., Parker, Tex. 75002; George D. Ezell, 3733 Pebble Beach, Farmers Branch, Tex. 75234

[21] Appl. No.: 213,192

[22] Filed: Mar. 15, 1994

[51] Int. Cl.⁶ .......................... G01K 5/00; F24F 7/00
[52] U.S. Cl. .................................. 236/49.3; 236/51; 374/197
[58] Field of Search ................. 374/197; 236/49.3, 51; 165/22

[56] References Cited

U.S. PATENT DOCUMENTS 4,382,543  5/1983  Morrison ...................... 236/51 X

FOREIGN PATENT DOCUMENTS 6011175  1/1994  Japan ............................ 236/51
6050592  2/1994  Japan ............................ 236/51

*Primary Examiner*—William E. Wayner
*Attorney, Agent, or Firm*—Gregory M. Howison; Joe H. Shallenburger

[57] ABSTRACT

A flow control device (34) is provided and is interfaced with at least one of the HVAC ducts (14). The flow control device (34) is operable to control the flow of air through the HVAC ducts (14) in response to flow control signals. A flow control command device (24) is disposed proximate to one efferent end (16) of the HVAC duct (14) for generating flow control commands. An ultrasonic transmitter (23) is provided and is coupled to the flow control command device (24). The transmitter (24) is operable to generate and transmit an ultrasonic carrier (26) modulated with the flow control commands to the flow control device (34) through the HVAC duct (14). An ultrasonic receiver (28) is provided for receiving the ultrasonic carrier modulated with the flow control commands and extracting the flow commands therefrom. A control system (30) is provided for converting the flow control commands to flow control signals for transfer to the flow control device (34) to control the operation thereof. A remotely disposed central control system (84) is provided for interpreting and analyzing the flow control commands received by the ultrasonic transceiver (82) in accordance with a control program and generating flow control signals to control the flow control devices (34) in response to receipt of the flow control commands by the ultrasonic transceiver (82).

28 Claims, 10 Drawing Sheets

METHOD AND APPARATUS FOR MONITORING AND CONTROLLING AIR HANDLING SYSTEMS

TECHNICAL FIELD OF THE INVENTION

The present invention pertains in general to a method and apparatus for controlling air handling systems, and more particularly, to a method and apparatus for controlling and monitoring air handling systems using ultrasonic communications.

BACKGROUND OF THE INVENTION

Air conditioning and heating effectiveness in a home or office environment can be greatly increased by using remotely controlled dampers to direct air flow into specific zones of the structure. These dampers typically use electromechanical devices to open or close moving panels or blades, or they consist of inflatable bladders that use air pressure to expand and vacuum pressure to contract. These dampers in turn control the air flow inside the air ducts to which they are attached. Dampers are installed in series with the air duct serving a particular zone of the structure. The dampers are typically linked to a central control panel by dedicated wiring or air hoses. The control panel is also connected to thermostats located in each zone that determine when heating, cooling or central ventilation is needed. Some thermostats have access to date and time information and, hence, can be programmed to request heating or cooling only when the zone is normally occupied. The central idea is to efficiently direct conditioned air or ventilation only to those areas where it is needed rather than attempting to sustain a certain temperature in the entire structure simultaneously.

One drawback in the use of the above-mentioned methods is the increased complexity and cost of wiring and piping needed in the attic of a structure to link the dampers and the thermostats with the control system. Each thermostat requires at least three wires, and sometimes as many as six wires to be connected to a central control system. Typically, five wires or an independent air hose for each damper is needed to link the dampers to the control system. The dampers generally require low voltage, alternating current or air pressure and vacuum pressure for operation. In the alternating current case, two wires are typically used to supply power and three wires are used to control the direction. For larger commercial applications, bundles of control wiring may range in size up to several inches in diameter to accommodate the numerous dampers and sensors located throughout these large structures. Both the installation and maintenance costs of these hardwired systems are of concern to builders, heating and air conditioning contractors, home owners and building managers. The complexity of a sophisticated system can make troubleshooting particularly difficult for the heating, ventilation and air conditioning (HVAC) technicians that provide installation or repair services. Advanced proportional air flow designs call for even more sophisticated control of these dampers so that they are positioned to meter the exact air flow desired for a particular zone. This method can add another level of wiring complexity to HVAC systems.

SUMMARY OF THE INVENTION

The present invention disclosed and claimed herein comprises a system and method for controlling air flow through the ducts of an HVAC system. A flow control device is provided and is interfaced with at least one of the HVAC ducts. The flow control device is operable to control the flow of air through the HVAC ducts in response to flow control signals. A flow control command device is disposed proximate to one efferent end of the HVAC duct for generating flow control commands. An ultrasonic transmitter is provided and is coupled to the flow control command device. The transmitter is operable to generate and transmit an ultrasonic signal modulated with the flow control commands to the flow control device through the HVAC duct. An ultrasonic receiver is provided for receiving ultrasonic signals modulated with the flow control commands and extracting the flow commands therefrom. A control system is provided for converting the flow control commands to flow control signals for transfer to the flow control device to control the operation thereof.

In another aspect of the present invention, the control system comprises a remotely disposed central control system for interpreting and analyzing the flow control command received by the ultrasonic receiver in accordance with a control program and generating flow control signals to control the flow control devices in response to receipt of the flow control commands by the ultrasonic receiver.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
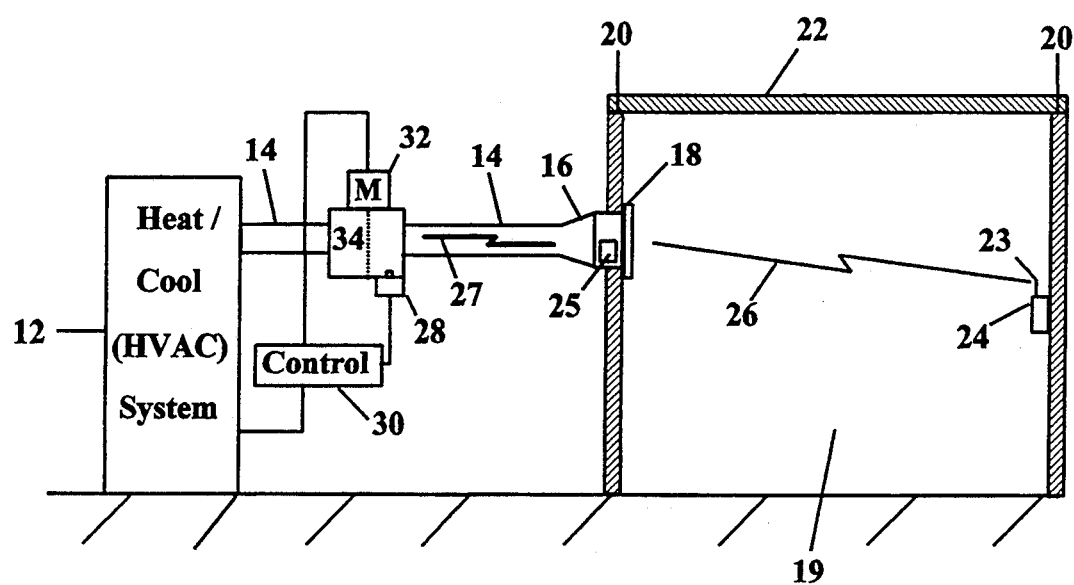
FIG. 1 illustrates a cross-sectional view of a house showing the system of the present invention.

Referring now to FIG. 1, there is illustrated a cross-sectional view of a house showing the system of the present invention. A heating, ventilation and air conditioning (HVAC) system 12 is provided having an air duct 14 which terminates in an efferent end 16 at a wall 20. On the opposite side of the wall 20, in the efferent end 16, is a register 18 through which air may flow into the room 19 defined by the walls 20 and ceiling 22. A flow control command device 24 is provided and is coupled to a transmitter 23. The flow control command device 24 has associated therewith "flow control information" that comprises any information available inside or proximal to a structure in which the ducts 14 are located. The transmitter 23 transmits flow control commands via ultrasonic, infrared or radio communication link 26 or through wires. If the communication link 26 is ultrasonic, it continues through the register 18 into the efferent end of the air duct 16 and through the air duct 14, as shown by transmission path 27. If the transmitter 23 uses a method other than an ultrasonic carrier, the signal is sent to a repeater 25, where the signal is received and is converted to an ultrasonic carrier on path 27, which is transmitted down the air duct 14 from the efferent end 16. The ultrasonic carrier on path 27 is received by an ultrasonic receiver 28. The ultrasonic carrier on path 27 is modulated with flow control commands from the flow control device 24. The ultrasonic receiver also extracts flow control commands from the ultrasonic carrier on path 27. The ultrasonic receiver 28 then sends the flow control commands to a control system 30, which converts the flow control commands to flow control signals which are then transferred to a damper motor 32 which is used to open or close the damper 34. The flow control signals can also be used to activate the HVAC system 12. However, it should be understood that any type of "pressure wave" device could be utilized, it being noted that it is the use of pressure waves through the ducts that provide the communications medium.

In operation, when a temperature in the room 19 is above or below a certain level, the flow control command device 24 sends flow control commands by its transmitter 23, either by an ultrasonic carrier to the ultrasonic receiver 28 or by another method of communication to the repeater 25, which then relays the commands via the ultrasonic carrier on path 27 to the ultrasonic receiver 28. The commands are then relayed to the control system 30 which converts the flow control commands to flow control signals which are then transferred to the damper motor 32 which is used to open or close the damper 34 allowing more or less air to travel through the HVAC duct 14 through the register 18 into the room 19. The flow control signals also activate the HVAC system 12 to turn on the heater or air conditioner and blower (not shown). A master flow control device 24 selects the heating or cooling process in the HVAC system 12.

Figure 2:
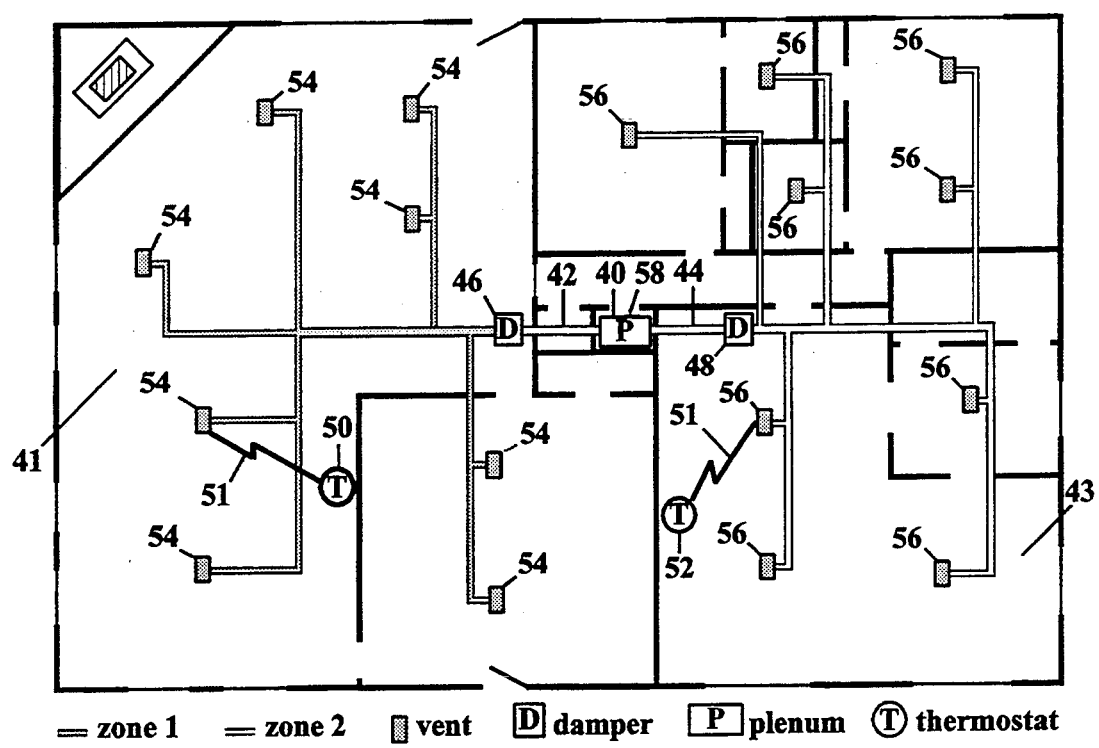
FIG. 2 illustrates an overhead cutaway view of the system of the present invention.

Referring now to FIG. 2, there is illustrated an overhead cutaway view of the system of ducts, vents, dampers and plenums in a typical house with two different heating and cooling zones utilizing the system of the present invention. A central plenum 40 is provided having an HVAC air duct 42 which provides air from the plenum 40 to a first zone 41 and another HVAC air duct 44 which provides air from the plenum to a second zone 43. A damper 46 is provided to control the air flowing through duct 42 into the rooms of zone 41. Another damper 48 is provided in the duct 44 to control the air flowing through the duct 44 to the rooms of zone 43. A flow control command device 50 is provided and is located inside a room of zone 41. Vents 54 are provided at the efferent ends of the ducts 42 of zone 41. A second flow control command device 52 is provided in a room of zone 43 of the house. Vents 56 are provided on the efferent ends of the ducts 44 in one of the rooms of zone 43. An ultrasonic receiver 58 is provided and is located in the plenum 40. A central control device is also provided (not shown) and is connected to the ultrasonic receiver 58, the dampers 46 and 48, and the HVAC unit (not shown).

In operation, when the temperature in zone 41 or zone 43 falls below or rises above a specified value, the flow control command device 50, or the flow control command device 52, sends an ultrasonic carrier 51 containing flow control commands through either of the vents 54 or 56, respectively, to the ultrasonic receiver 58. The ultrasonic receiver 58 extracts flow control commands from the ultrasonic carrier 51. The flow control commands are then transferred to a central control device (not shown). The central control device converts the flow control commands to flow control signals which are sent to the dampers 46 or 48, respectively, by wires (not shown). These signals then open the respective damper 46 or 48 to allow more air to travel to zone 41 or zone 43, respectively. The central control device (not shown) also turns on the HVAC system (not shown), which causes air to be blown through the plenum 40 and through the ducts 42 or 44, respectively. Normally, the zones are divided into those for daytime use, such as zone 41 for the living, dining and kitchen areas and zone 43 covering the bedrooms and sleeping areas. Since all devices have a common ultrasonic carrier for communications and control, each flow control command device 50 and 52 in the system is given a unique digital address. The address is selectable when the device is installed.

Figure 3A:
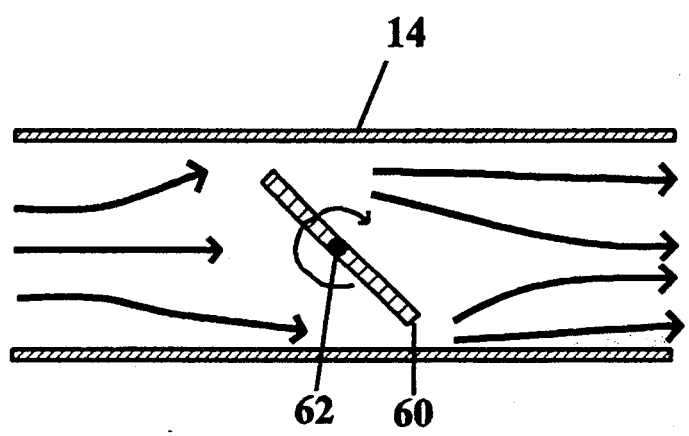
FIG. 3a illustrates a cross-sectional view of a blade damper installed in an air duct.

Referring now to FIG. 3a, there is illustrated a cross-sectional view of a blade damper 60 disposed inside the HVAC duct 14. A round shaft 62 is provided and connected to the blade 60 and a motor (not shown). In operation, when it is desired that air be allowed to pass through the air duct 14, the blade 60 is rotated by an AC motor (not shown) which turns a round shaft 62 to rotate the blade 60, 90° so that the blade is parallel with the direction of the normal airflow. When the blade damper is in a horizontal position, air flows through the HVAC duct 14 past the blade damper 60 which offers little or no resistance when it is in a horizontal position. When the blade 60 is rotated so it is in a vertical position, so as to be perpendicular to the direction of normal flow of air, the blade 60 then restricts the air flow through HVAC duct 14.

Figure 3B:
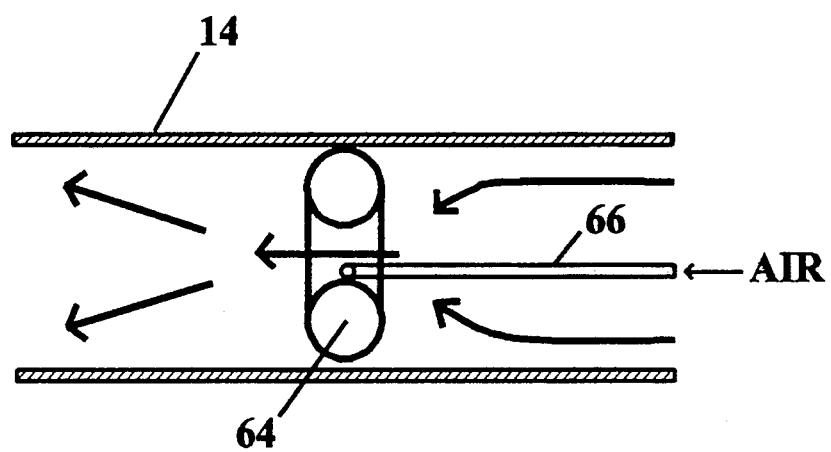
FIG. 3b illustrates a cross-sectional view of a balloon damper installed in an air duct.

Referring to FIG. 3b, there is shown a cross-sectional view of a balloon damper. An HVAC air duct 14 is provided. A flexible cylindrical bladder 64 is provided on the inside of the HVAC air duct 14. An inflation tube 66 is also provided. In operation, when positive air pressure is applied through the inflation tube, the flexible bladder 64 expands and reduces the opening in the HVAC air duct 14 such that air flow is restricted through the duct 14. When the air pressure is reduced from the inflation tube 66, the bladder 64 contracts, allowing a wider opening through the center of the HVAC air duct 14 which allows air to pass freely.

Figure 4:
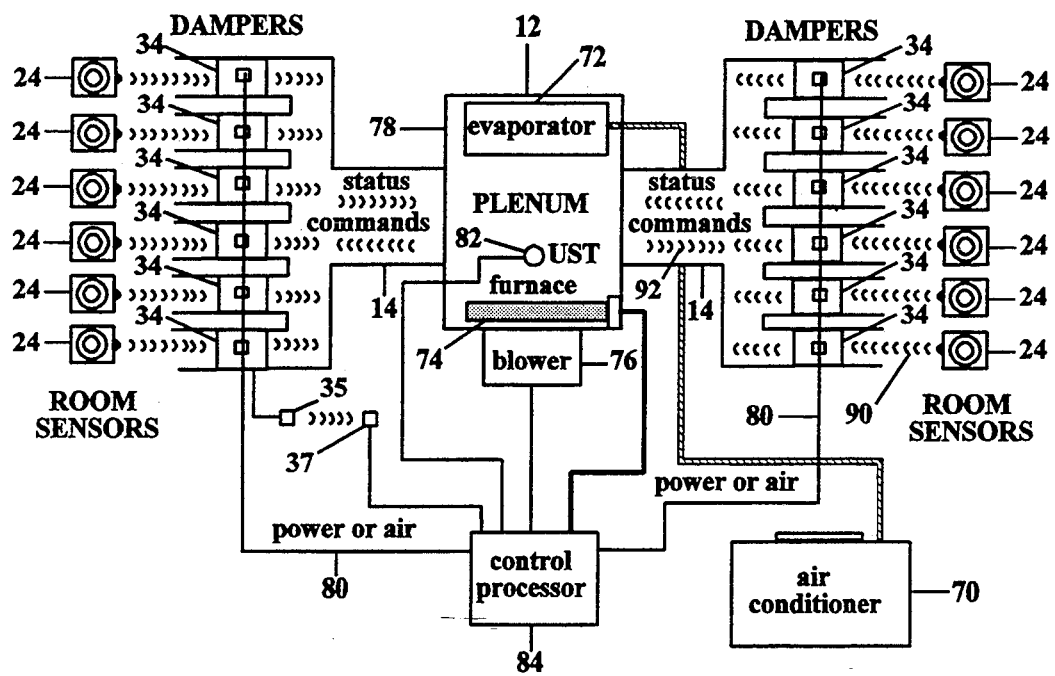
FIG. 4 illustrates a diagrammatic view of the system of the present invention.

Referring now to FIG. 4, there is illustrated a diagrammatic view of the system of the present invention. An HVAC system 12 is provided having an air conditioner condenser 70, an evaporator 72, a furnace 74 and a blower 76. The blower 76 is attached to a plenum 78, which is attached to HVAC air ducts 14. In each of the HVAC air ducts 14, a damper 34 is provided. The dampers 34 are attached to either a power or air supply 80 to operate the dampers 34. The efferent end of each HVAC air duct 14 opens into a room having dedicated flow control command devices 24 associated therewith.

An ultrasonic transceiver (UST) 82 is provided and located within the plenum 78 of the HVAC system 12. The ultrasonic transceiver is connected to a control processor 84. The control processor 84 is connected to the air conditioner 70, the furnace 74, the blower 76 and also the power or air supply line 80. The flow control command devices 24 are sensors coupled with an ultrasonic transmitter that can send information via an ultrasonic carrier 90 to the ultrasonic transceiver 82. The ultrasonic transceiver 82 can also send commands via an ultrasonic carrier 92 to an ultrasonic receiver (not shown) located near the damper 34 or the transceiver (not shown) located at each of the flow control command devices 24.

In operation, each of the flow control command devices 24 senses certain parameters such as temperature, humidity, motion, artificial light, entry, exit, smoke, etc. in the associated room. Each flow control command device 24 then communicates this information via an ultrasonic transmission path 90 through the HVAC ducts 14 to the ultrasonic transceiver 82 which receives the ultrasonic carrier on path 90. The ultrasonic transceiver 82 then extracts the flow control commands from the ultrasonic carrier and transfers the flow control commands to the central processor 84. The central processor 84 then turns on either the air conditioner condenser 70 or the furnace 74 and the blower 76. The control processor also sends a signal to the ultrasonic transceiver 82 which is transmitted via an ultrasonic carrier on a transmission path 92 to an ultrasonic receiver (not shown), coupled to a damper 34. The command will cause the damper 34 to open to allow more air to flow through the HVAC duct 14 or to close to allow less air to flow through the HVAC duct 14, and into the room containing the flow control command device 24. The ultrasonic transceiver (not shown), coupled to the damper 34, may also be used to relay the ultrasonic carrier on path 90 from the flow control command device 24 to the ultrasonic transceiver 82. The control processor 84 may also send commands through the ultrasonic transceiver 82 through the HVAC ducts 14 to the individual flow control command devices 24. The ultrasonic transceiver coupled to the damper (not shown) may also send information from the damper to the control processor 84 through the ultrasonic transceiver 82.

Alternately, the transceiver (not shown) proximate the damper 34 may communicate along an alternate path directly to the central system outside the duct 14. A transceiver 35 is provided electrically coupled to the transceiver (not shown) proximate the damper 34. It communicates with a transceiver 37 directly coupled to the control processor 84, i.e., via a path through, for example, an attic in which the duct 14 is disposed.

Figure 5:
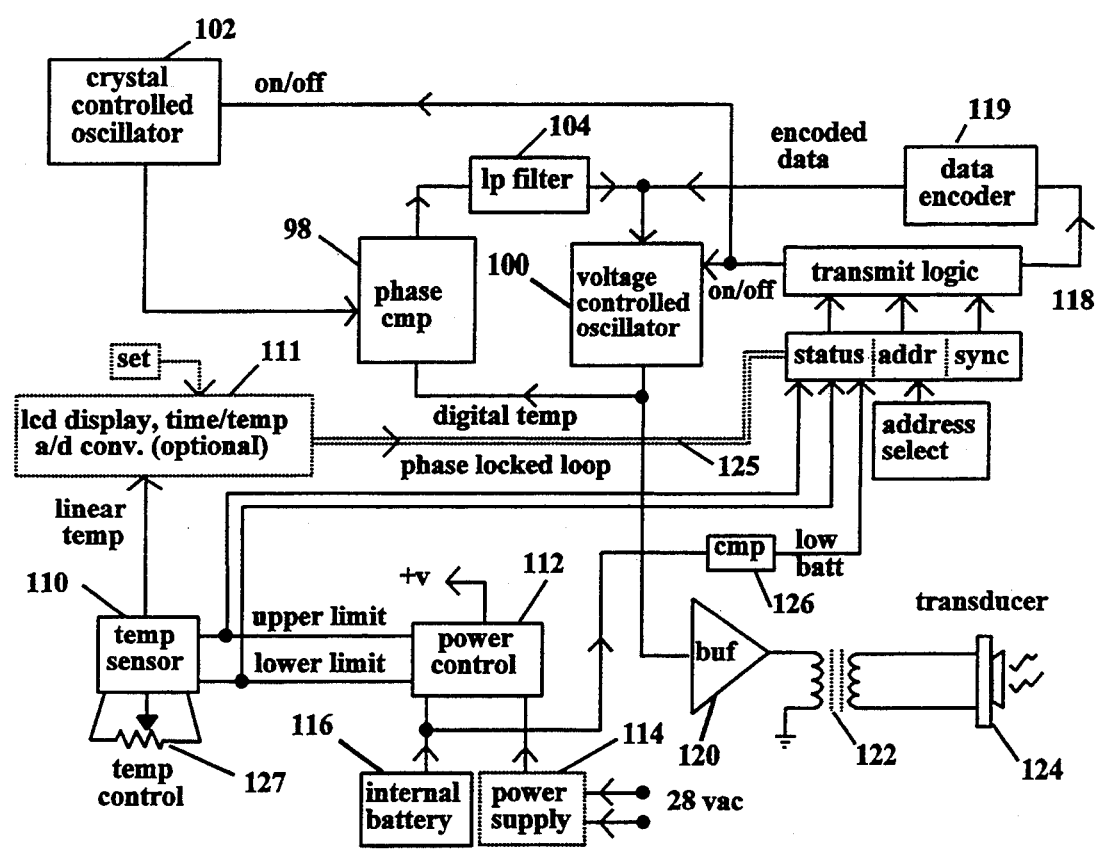
FIG. 5 illustrates a schematic diagram of the ultrasonic thermostat implementation of the flow control command device.

Referring now to FIG. 5 there is illustrated a schematic diagram of the ultrasonic thermostat implementation of the flow control command device. A phase detector or comparator 98 is provided having two inputs and one output. A crystal-controlled oscillator 102 is provided having an output and an input. One input to the phase detector 98 is connected to the output of the crystal-controlled oscillator 102. A voltage controlled oscillator 100 is provided having two inputs and one output. The second input to the phase detector 98 is connected to the output of the voltage controlled oscillator 100. A low pass filter 104 is provided having an input and an output. The output of the phase detector 98 is connected to the input of the low pass filter 104, and the output of the low pass filter 104 is connected to the input of the voltage controlled oscillator 100. A temperature sensor 110 is provided having a temperature control 127 and also having a linear absolute temperature output and two switched voltage outputs that are turned on when either an upper limit temperature is reached or a lower limit temperature is reached. The temperature sensor 110 may be interfaced to an optional LCD display driver and A/D converter to display time and temperature and to provide a digital temperature for status transmission. A power control unit 112 is provided, having power input from a power supply 114 and an internal battery 116, and also receiving the two switched limit outputs of temperature sensor 110. A transmit logic circuit 118 is provided having inputs of status, synchronization and address data and outputs of "off" and "on " control and data output. The status input of the transmit logic circuit 118 is connected to the switched outputs of the temperature sensor 110 and optionally to the digital temperature output from the LCD display and A/D converter 111. Low battery indication from comparator 126 is also provided as input status. The "off" and "on " output of the transmit logic circuit 118 is connected to one input of the voltage controlled oscillator 100 and the input of the crystal-controlled oscillator 102, and is used to turn the voltage controlled oscillator 100 and the crystal-controlled oscillator 102 on and off.

A data encoder 119 is provided having an input and an output. The data output of the transmit logic circuit 118 is connected to the input to the data encoder 119. The output of the data encoder 119 is connected to the input of the voltage controlled oscillator 100 at the same node as the output to the low pass filter 104. A buffer amplifier 120 is provided having an input and an output with the input connected to the output of the voltage controlled oscillator 100, which is frequency modulated by the output from data encoder 119. A step-up transformer 122 is provided and is coupled to a transducer 124. The output of the buffered amplifier is connected to the step-up transformer 122, which is coupled to the transducer 124. Alternatively, the capacitive transducer 124 might be coupled through an inductor to the output of buffer 120 to form a series resonant coupling circuit.

In operation, the output of the crystal-controlled oscillator 102 is input to the phase detector 98, which sets the ultrasonic carrier frequency for the transmitter. The output of the phase detector 98 is coupled to the input of the voltage controlled oscillator 100 through a low pass filter 104. This provides a phase-locked loop closed loop feedback path to keep the average frequency of the voltage controlled oscillator phase-locked to the stable frequency of the crystal-controlled oscillator 102. The time constant of the low pass filter 104 is set sufficiently long so that deviation (sweeping) of the voltage controlled oscillator 100 output frequency over a very narrow range, controlled by the output voltage from data encoder 119, can be achieved without undue damping from the feedback circuits. The data is transmitted digitally using frequency modulation of the voltage controlled oscillator 100 output. The output frequency is swept over a range of frequencies to produce a chirp signal. The frequencies are swept in an increasing or decreasing fashion from around a specific center frequency that coincides with the peak response of the ultrasonic transducer 124. Signal nulls, which are the result of multi-path communications resulting in selective and destructive interference at specific locations, are overcome by detecting the direction of frequency change and ignoring the loss of signal that may occur at one or more specific frequencies. An increasing or decreasing frequency change can be defined to represent a digital value of "1" or "0" or it can also be encoded to represent a change in a current digital value from a "0" to a "1" or vice versa.

When the temperature sensor 110 senses an upper limit or lower limit temperature reached, that information is output to the power control 112. The power control 112 then connects the voltage output of the power supply 114 or the internal battery 116 to the power bus to energize the remaining circuits. The transmit logic circuit 118 then turns on the voltage controlled oscillator 100 and the crystal-controlled oscillator 102. The output of the transmit logic circuit 118 travels through a data encoder 119 and is input to the voltage controlled oscillator 100. Digital information translated as frequency modulation of the voltage controlled oscillator's 100 output will consist of a synchronization preamble, a unique device address, a low battery indication, a request for either heating or cooling and absolute temperature (if required). In addition, any other sensor data such as relative humidity, occupancy or security may be transmitted. Since all devices share a common ultrasonic carrier for communications and control, each device in the system is given a unique digital address. The address is selectable when the device is installed. This digital data is encoded by frequency modulating the voltage controlled oscillator 100 output frequency, and stability is achieved by phase-locking the average transmitted frequency to the stable crystal-controlled oscillator 102. The output of the frequency modulated voltage controlled oscillator 100 is sent through the buffer amplifier 120 and the step-up transformer 122 to a piezoelectric transducer 124, where the information is transmitted on an ultrasonic carrier.

When operating on battery power, the temperature sensor 110 only receives power from the internal battery 116 every few minutes where it then determines if the upper or lower limit has been determined. If the upper or lower limit has been determined, that indicates a need for cold or heat, respectively, and causes a brief transmission cycle. Periodic transmissions continue until the temperature limit switches are satisfied without regard to the value or change in direction of the absolute temperature output of the temperature sensor 110. Optionally, the transmitter logic circuit 118 may monitor the absolute temperature output of the temperature sensor 110 for a desired direction change over time and transmissions may be repeated on regular intervals until the absolute temperature output of the temperature sensor 110 is determined to be incrementing in the right direction.

Figure 6:
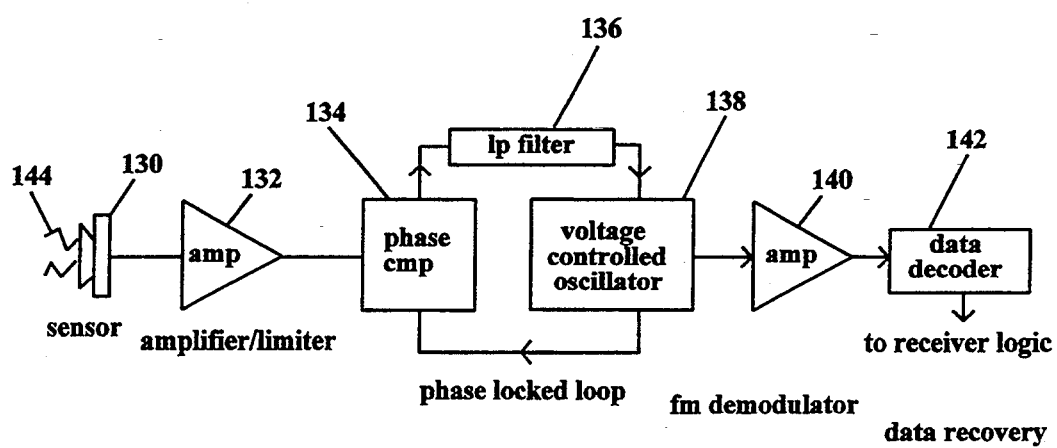
FIG. 6 illustrates a schematic diagram of the ultrasonic receiver and data demodulator decoder.

Referring now to FIG. 6, there is illustrated a schematic diagram of the ultrasonic receiver and data demodulator/decoder. A receiver transducer 130 is provided comprising a piezoelectric (capacitive) receiver transducer having an output. An amplifier/limiter circuit 132 is provided having an input and an output comprising a charge sensitive pre-amplifier for the piezoelectric receiver transducer 130 and also comprising a high voltage gain and hard limiting amplifier circuit for the carrier 144. The phase detector 134 is provided having two inputs and one output. The output of transducer 130 is connected to the input of the amplifier/limiter circuit 132. The output of the amplifier/limiter circuit 132 is connected to one of the inputs of the phase detector 134. A low pass filter 136 is provided having an input and an output and a voltage control oscillator 138 is provided having an input and two outputs. One output of the voltage controlled oscillator 138 is connected to the input of the phase detector 134. The output of the phase detector 134 is connected to the input of the low pass filter 136 and the output of the low pass filter 136 is connected to the input of the voltage controlled oscillator 138. A phase comparator 134, low pass filter 136 and voltage controlled oscillator 138 provide a phase-locked loop circuit. The remaining output of the voltage controlled oscillator 138 comprising a demodulated signal from carrier 144, is connected to a data amplifier and hard limiter circuit 140, having an input and an output. The output of the data amplifier and hard limiter circuit 140 is connected to a data decoder logic circuit 142 and the output of the data decoder logic circuit 142 is input into receiver logic (not shown).

In operation, the transducer 130, which is an ultrasonic piezoelectric transducer similar to that described above with respect to FIG. 5, receives an ultrasonic carrier 144 transmitted from a remote location. The ultrasonic carrier 144 is amplified and hard limited by the carrier amplifier/limiter circuit 132. The output of the amplifier/limiter circuit 132 is then input to one input of the phase detector 134 connected as part of the phase-locked loop circuit. The voltage controlled oscillator 138 is also input to the phase detector 134 and the voltage controlled oscillator 138 is programmed to run very near the transmitter carrier frequency. The output of the phase comparator 134 is input into a low pass filter 136, which in turn is connected to the input of the voltage controlled oscillator 138 to provide a closed loop feedback path to force the voltage controlled oscillator 138 to both capture and lock onto the frequency and the phase of the ultrasonic carrier 144. The input to the voltage controlled oscillator 138, which is the output of the phase detector 134 after passing through the low pass filter 136, contains the instantaneous phase difference between the input carrier 144 and the local voltage controlled oscillator 138 and is proportional to the instantaneous frequency modulation of the ultrasonic carrier 144. This signal, which is the output of the voltage controlled oscillator 138 represents the demodulated information from the ultrasonic carrier 144 and it is then amplified and hard limited by the data amplifier/limiter circuit 140. The signal is then decoded by the data decoder circuit 142 for data recovery and input into a receiver logic circuit (not shown).

The frequency of the ultrasonic carrier 144 is swept over a range of frequencies to produce a chirp signal. The frequencies are swept in an increasing or decreasing fashion from around a specific center frequency that coincides with the peak response of the ultrasonic transducer 130. Signal nulls, which are the result of multipath communications resulting in selective and destructive interference at specific locations, are overcome by detecting the direction of frequency change and ignoring the loss of signal that may occur at one or more specific frequencies. An increasing or decreasing frequency change can be defined to represent a digital value of "1" or "0" or it can also be encoded to represent a change in a current digital value from a "0" to a "1" or vice versa.

Figure 7:
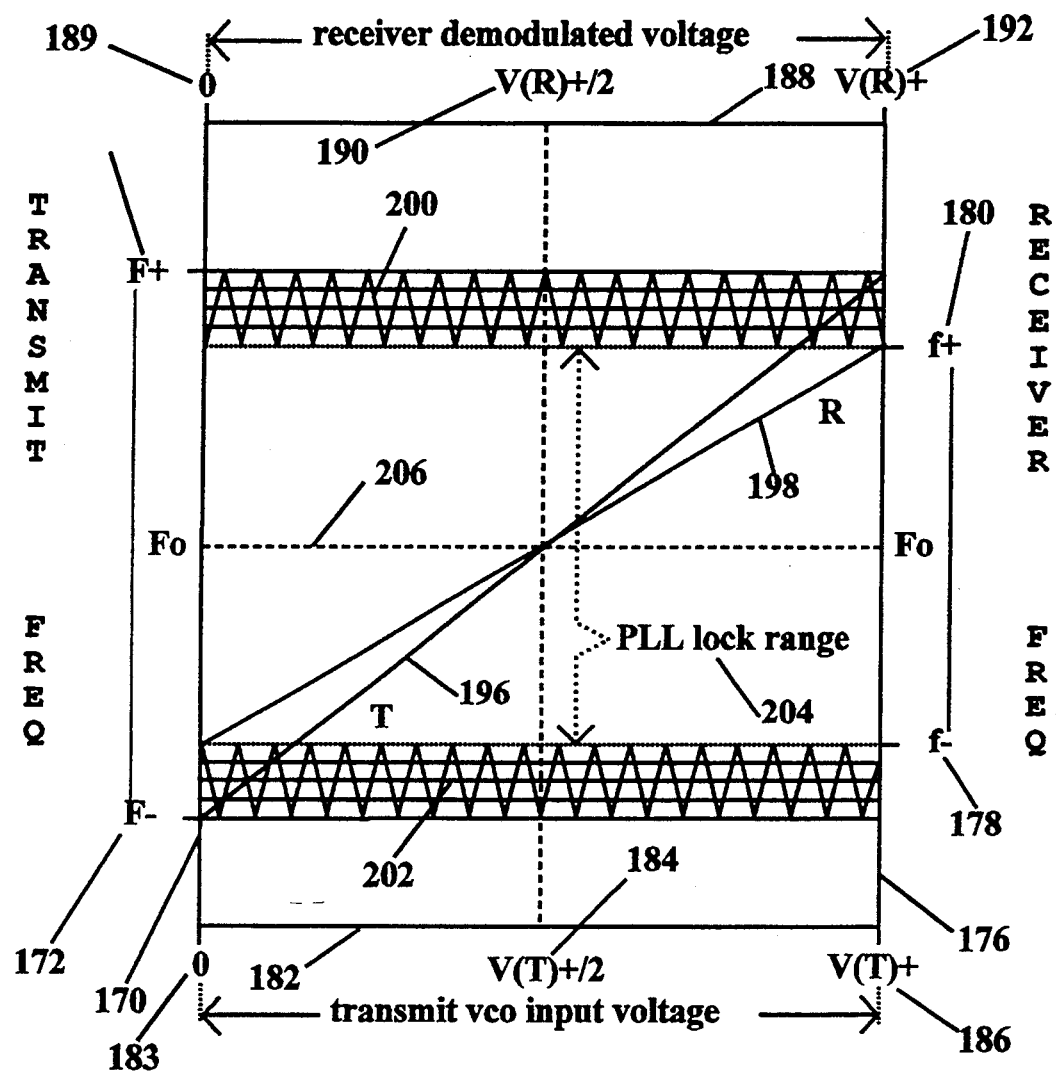
FIG. 7 illustrates the receiver phase-locked loop demodulated output voltage range as a function of the input (transmitter) carrier frequency range.

Referring now to FIG. 7, there is illustrated the relationship of the receiver phase-locked loop demodulated output voltage range verses the input (transmitter) carrier frequency range. The left vertical axis is representative of the transmit frequency 170, having a transmit frequency minimum F−172 and a transmit frequency maximum F+174. The right vertical axis is representative of the receiver frequency 176 having a receiver frequency minimum f−178 and a receiver frequency maximum f+180. The lower horizontal axis is representative of the transmit voltage controlled oscillator (VCO) input voltage 182 ranging from a value of zero 183 on the far left to a value of V(T)+, 186 on the right, where V(T)+ represents the logic "high" voltage for the transmitter, and having a voltage of V(T)+/2, 184 in the middle. The upper horizontal axis is representative of the receiver demodulated voltage 188, having a value of zero 189 on the far left and a value of V(R)+192 on the right, where V(R)+ represents the most positive output from the receiver demodulator, with a voltage of V(R)+/2 190 in the middle. A line showing a transmit VCO input voltage 196 is provided showing the transmit VCO input voltage 182 as the transmit frequency 170 ranges from F−172 to F+174. A line showing the receiver demodulated voltage 198 is provided showing the receiver demodulated voltage 188 as the receiver frequency 176 ranges from f−178 to f+180. A shaded area 200 is defined by the difference between transmit F+174 and receiver f+180 and shaded area 202 defined by the difference between transmit frequency F−172 and receive frequency f−178. The phase-locked loop (PLL) lock range 204 is defined by the receiver frequency f+180 and the receiver frequency f−178. Also provided is the crystal oscillator frequency $F_o$206, which is defined as the center frequency for both transmitter VCO range (F− to F+) and receiver demodulator range (f− to f+).

In operation, the demodulated output 188 remains locked at V(R)+ volts 192 for input frequencies above receiver frequency f+180 and remains locked at zero volts 189 for input frequencies lower than receiver frequency f−178. The phase-locked loop lock frequency range 204 for the receiver is maintained within the maximum deviation range of the transmitter, which is transmit frequency F+174 to transmit frequency F−172. Each digital bit transmitted drives the transmitter frequency 170 to the limit (transmit frequency F+174 or transmit frequency F−172), depending on the modulation scheme employed. The receiver phase-locked loop is forced to a hard limit when the received signal frequency 176 exceeds its lock range 204, which is receiver frequency f+180 to receiver frequency f−178. The receiver demodulated output is much less responsive to amplitude and/or phase distortion once the lock range is exceeded. The receiver phase-locked loop is designed to operate in this preferred mode in order to be less impacted by the significant input signal phase and amplitude distortions and dropouts caused by severe multi-paths associated with ultrasonic transmissions and reflective environments. Digital signal information (binary ones and zeros) is determined in the transition interval from receiver frequency f+180 to transmitter frequency F+174 (region 200) and from receiver frequency f−178 to transmitter frequency F−172 (region 202). Binary digital data can be transmitted either as a return to zero (RTZ) signal or a non-return to zero (NRZ) signal. For RTZ transmissions, the transmitter voltage control oscillator is driven to either frequency F+174 or F−172 for a portion of the bit interval, e.g., one-half, and then returned to the crystal oscillator frequency $F_o$206 for the remainder of the bit interval. For NRZ transmissions, the voltage controlled oscillator is driven to either transmit frequency F+174 or F−172 for the complete bit interval time and does not stop at $F_o$206.

Figure 8:
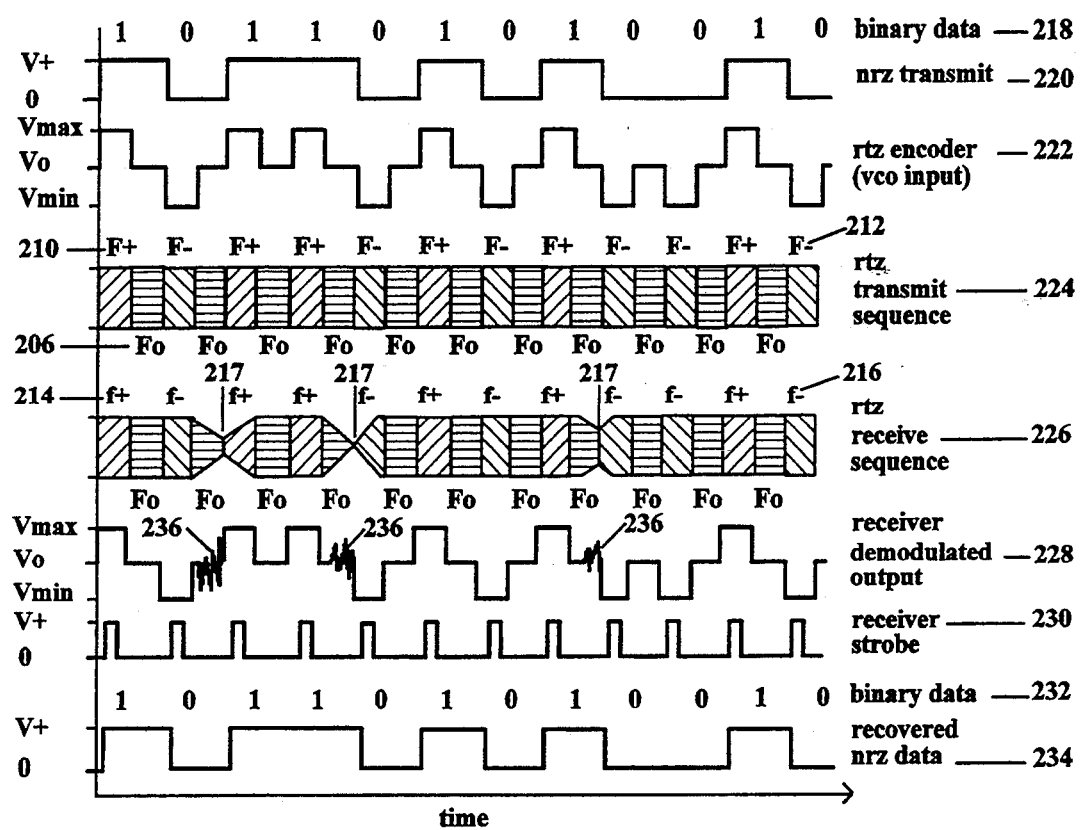
FIG. 8 illustrates a typical system timing diagram for a return to zero (RTZ) implementation.

Referring now to FIG. 8, there is illustrated a typical system timing diagram for a return to zero (RTZ) implementation. The frequencies F+210 and F−212 correspond to the transmitter frequency F+174 and F−172, respectively. f+214 and f−216 correspond to the receiver frequencies f+180 and f−178 of FIG. 7, respectively. $F_o$206 is the crystal-controlled oscillator frequency corresponding to $F_o$206 of FIG. 7. NRZ transmitted data 220 is shown ranging from zero volts, indicating a binary digit of "0", to V+ volts indicating a binary digit of "1". The RTZ encoder output, which is the voltage controlled oscillator input 222 ranges from a minimum of $V_{min}$ volts to a maximum of $V_{max}$ returning to $V_o$ volts between digits. The RTZ transmit sequence 224 is shown ranging from F+210 to F−212 and returning to $F_o$206 between each digit. An RTZ receive sequence 226 ranges from f+214 to f−216 and returning to $F_o$206 between each digit. The reduced amplitude areas 217 in the RTZ receive sequence 226 illustrate areas where signal, phase and amplitude distortion have occurred. The receiver demodulated output 228 is shown varying from a voltage of $V_{max}$ volts to $V_{min}$ volts and returning to a voltage of $V_o$ volts between digits. The noise 236, shown occurring in the receiver demodulated output 228, illustrates the effect of the phase distortions and reduced amplitude areas 217 in the RTZ receive sequence 226. These noise oscillations 236 are clamped by causing transmit frequency limits, F+ and F−, to exceed the receiver capture frequency limits, f+ and f−. This is the range defined as 200 and 202 of FIG. 7. A strobe 230 varying between zero volts and V+ volts is used to recover NRZ data 234. Strobe 230 is timed to occur in the approximate center of the f+214 and f−216 time intervals. The PLL lock range is exceeded at these times and potential noise amplitudes are clamped at $V_{max}$ or $V_{min}$ at the receiver demodulator output 228.

Figure 9:
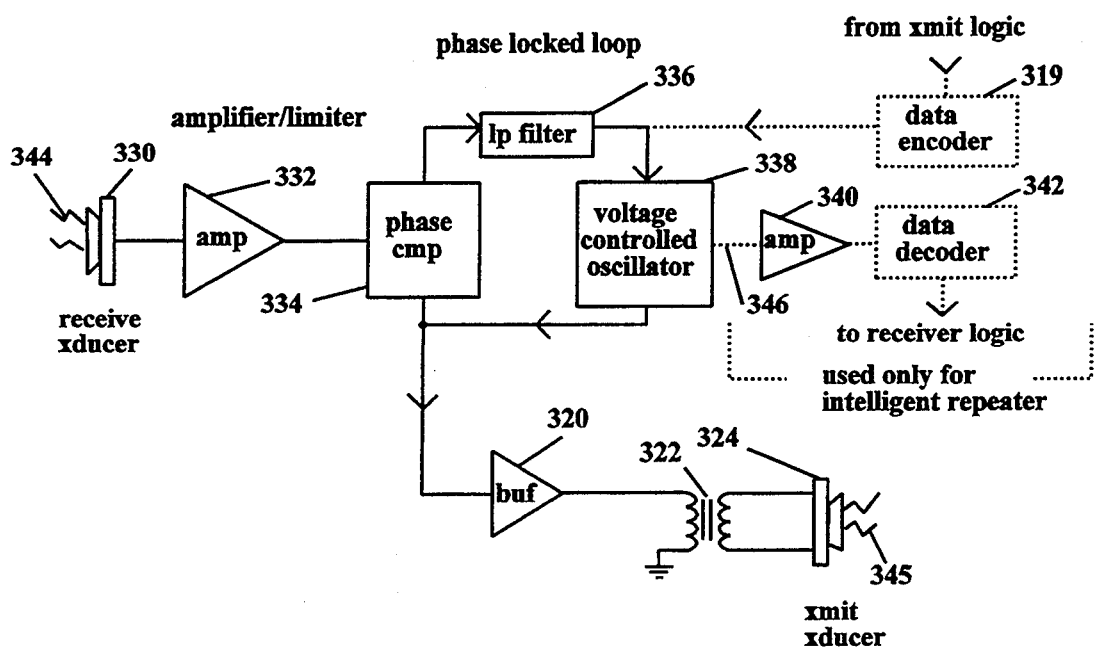
FIG. 9 illustrates a schematic diagram of the ultrasonic repeater.

Referring now to FIG. 9, there is illustrated a schematic block diagram of an ultrasonic repeater. A receiver transducer 330 is provided comprising a piezoelectric (capacitive) receiver transducer having an output. An amplifier/limiter circuit 332 is provided having an input and an output and comprising a charge sensitive pre-amplifier for the piezoelectric receiver transducer and also comprising a high voltage gain and hard limiting amplifier circuit for the carrier. A phase detector 334 is provided having two inputs and one output. The output of transducer 330 is connected to the input of the amplifier/limiter circuit 332. The output of the amplifier/limiter circuit 332 is connected to one of the inputs of the phase detector 334. A low pass filter 336 is provided having an input and an output and a voltage control oscillator 338 is provided having an input and two outputs. One output of the voltage controlled oscillator 338 is connected to the input of the phase detector 334. The output of the phase detector 334 is connected to the input of the low pass filter 336 and the output of the low pass filter 336 is connected to the input of the voltage controlled oscillator 338. A phase comparator 334, low pass filter 336 and voltage - controlled oscillator 338 comprise a phase-locked loop circuit. A buffer amplifier 320 is also provided having an input and an output. The input of the buffer amplifier 320 is connected to the output of the voltage controlled oscillator 338. A step-up transformer 322 is provided and is coupled to a transducer 324. The output of the buffered amplifier is connected to the step-up transformer 322, which is coupled to the transducer 324.

Also provided are optional decoding and encoding circuits for use when response to commands and reporting of local status information is necessary. An amplifier and hard limiter circuit 340, having an input and an output is provided. The remaining output 346 of the voltage controlled oscillator 338 is connected to the input of the amplifier/limiter circuit 340. The output of the data amplifier and hard limiter 340 is connected to a data decoder logic circuit 342 and the output of the data decoder logic circuit 342 is input into receiver logic (not shown). A data encoder 319 is also provided having an input and an output. Output of the transmit logic circuit (not shown) is connected to the input of the data encoder 319, and the output of the data encoder 319 is connected to the input of the voltage controlled oscillator 338 at the same node as the output to the low pass filter 336.

In operation, the transducer 330, which is an ultrasonic piezoelectric transducer similar to that described above with respect to FIG. 6, receives an ultrasonic carrier 344 transmitted from a remote location such as a flow control command device or a thermostat (not shown). The ultrasonic carrier 344 is amplified and hard limited by the carrier amplifier/limiter circuit 332. The output of the amplifier/limiter circuit 332 is then input to one input of the phase detector 334 connected as part of a phase-locked loop circuit. The voltage controlled oscillator 338 is also input to the phase detector 334 and the voltage controlled oscillator 338 is programmed to run very near the transmitter carrier frequency. The output of the phase comparator 334 is input into a low pass filter 336, which in turn is connected to the input of the voltage controlled oscillator to provide a closed loop feedback path to force the voltage controlled oscillator 338 to both capture and lock onto the frequency and the phase of the carrier 344. The output of the amplifier/limiter circuit 332 feeds the phase-lock loop which forces the local voltage controlled oscillator 338 to phase-lock to the incoming ultrasonic carrier 344. The input to the voltage controlled oscillator 338, which is the output of the phase detector 334 after passing through the low pass filter 336, contains the instantaneous phase difference between the input carrier 344 and the local voltage controlled oscillator 338 and is proportional to the instantaneous frequency modulation of the ultrasonic carrier 344. The VCO 338 output is thus a regenerated and phase-locked replica of the input 344. This signal is sent through a buffer amplifier 320 and a step-up transformer 322 to a piezoelectric transmitter 324, where the input information 344 is retransmitted on an output ultrasonic carrier 345.

When the optional decoding and encoding circuits are used, one signal, which is the demodulator output 346 of the voltage controlled oscillator 338 and represents the digital information from the ultrasonic carrier 344, is amplified and hard limited by the data amplifier/limiter circuit 340. The signal is then decoded by the data decoder circuit 342 for data recovery and input into a receiver logic circuit (not shown). A data encoder 319 is also provided with an input and an output. Also provided is a transmit logic circuit (not shown) having an output. The output of the transmit logic circuit (not shown) is input into the data encoder 319. The output of the data encoder 319 is input to the voltage controlled oscillator 338. Digital information translated as frequency modulation of the output of the voltage controlled oscillator 338 will consist of a synchronization preamble, a unique address and any other information which is required. This digital data is encoded as frequency modulation of the voltage controlled oscillator 338 output frequency.

Figure 10:
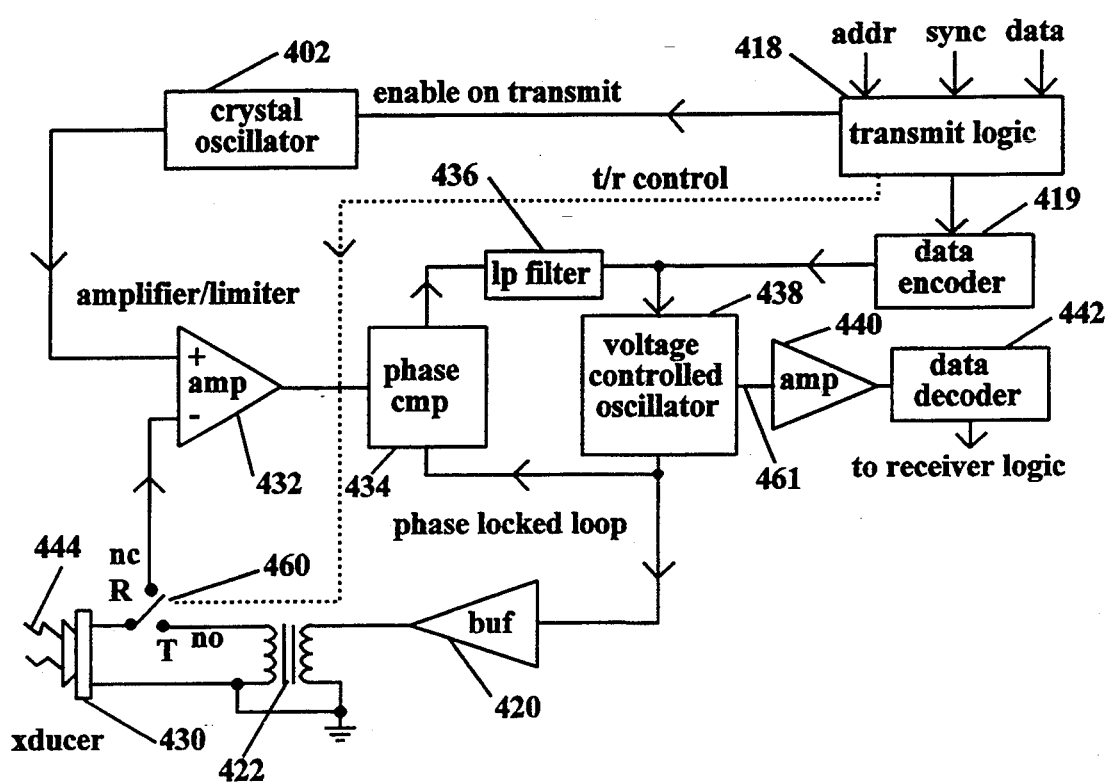
FIG. 10 illustrates a schematic diagram of the ultrasonic transceiver.

Referring now to FIG. 10, there is shown a schematic block diagram of an ultrasonic transceiver. A receiver transducer 430 is provided comprising a piezoelectric (capacitive) receiver transducer having an output. An amplifier/limiter circuit 432 is provided having an input and an output comprising a charge sensitive preamplifier for the piezoelectric receiver transducer and also comprising a high voltage gain and hard limiting amplifier circuit for the carrier. A phase detector 434 is provided having two inputs and one output. The transducer 430 is connected to a two-position switch 460 having one position for receive and one position for transmit. When in the receive mode, the output of transducer 430 is connected to the input of the amplifier/limiter circuit 432. The output of the amplifier/limiter circuit 432 is connected to one of the inputs of the phase detector 434. A low pass filter 436 is provided having an input and an output and a voltage control oscillator 438 is also provided having an input and two outputs. One output of the voltage controlled oscillator 438 is connected to the input of the phase detector 434. The output of the phase detector 434 is connected to the input of the low pass filter 436 and the output of the low pass filter 436 is connected to the input of the voltage controlled oscillator 438. The phase comparator 434, low pass filter 436 and voltage controlled oscillator 438 comprise a phase-locked loop circuit. An amplifier and hard limiter circuit 440, having an input and an output, is provided. The remaining output 461 of the voltage controlled oscillator 438 is connected to the input of the amplifier/limiter circuit 440. The output of the amplifier/limiter 440 is connected to a data decoder logic circuit 442 and the output of the data decoder logic circuit 442 is input into receiver logic (not shown).

A transmit logic circuit 418 is provided having inputs for receiving address and synchronization information and data, and three outputs. A crystal-controlled oscillator 402 is provided having an input and an output. One output of the transmit logic circuit 418 is connected to the crystal-controlled oscillator 402 and is used to enable the crystal-controlled oscillator 402 during transmission. The output of crystal-controlled oscillator 402 is connected to the input of the amplifier/limiter circuit 432. A data encoder 419 is provided having an input and an output. One output of the transmit logic circuit 418 is connected to the input of the data encoder 419, and the output of the data encoder 419 is connected to the input of the voltage controlled oscillator 438 at the same node as the output of the low pass filter 436. A buffer amplifier 420 is provided having an input and an output. The input of the buffer amplifier 420 is connected to one output of the voltage controlled oscillator 438. A step-up transformer 422 is provided and is coupled to the transducer 430 when the switch 460 is in transmit mode. The output of the buffered amplifier 420 is connected to the step-up transformer 422, which is coupled to the transducer 430.

In operation, when the transmit logic 418 switches switch 460 to the receive position, the transducer 430 receives an ultrasonic carrier 444 transmitted from a remote location such as a flow control command device, repeater or a thermostat (not shown). A received ultrasonic carrier 444 is amplified and hard limited by the carrier amplifier/limiter circuit 432, which consists of a charge sensitive pre-amplifier for the piezoelectric receiver transducer 430 and also provides high voltage gain and hard limiting of the received signal 444. The output of the amplifier/limiter circuit 432 is then input to one input of the phase detector 434 connected as part of a phase-locked loop circuit. The voltage controlled oscillator 438 is also input to the phase detector 434 and the voltage controlled oscillator 438 is programmed to run very near the transmitter carrier frequency. The output of the phase comparator 434 is input into a low pass filter 436, which is in turn is connected to the input of the voltage controlled oscillator to provide a closed loop feedback path to force the voltage controlled oscillator 438 to both capture and lock onto the frequency and the phase of the carrier 444. The output of the amplifier/limiter circuit 432 feeds the phase-lock loop which forces the local voltage controlled oscillator 438 to phase-lock to the incoming ultrasonic carrier 444. The input to the voltage controlled oscillator 438, which is the output of the phase detector 434 after passing through the low pass filter 436, contains the instantaneous phase difference between the input carrier 444 and the local voltage controlled oscillator 438 and is proportional to the instantaneous frequency modulation of the ultrasonic carrier 444. This signal is buffered in the voltage controlled oscillator 438 and appears as the demodulator output 461. This signal is amplified and hard limited by the data amplifier/limiter circuit 440 and is then decoded by the data decoder circuit 442 for data recovery and input into a receiver logic circuit (not shown).

When the transmit logic 418 switches switch 460 to the transmit position, the transducer 430 is connected to the transformer 422. The transmit logic 418 enables the crystal-controlled oscillator 402 to provide a reference frequency for the phase detector 434. A data encoder 419 is also provided with an input and an output. The transmit logic 418 then outputs information, such as the appropriate synchronization, address, status and digital data to the input of the data encoder 419. The output of the data encoder 419 is then input into the voltage controlled oscillator 438 at the same node as the low-pass filter 436. The output of the voltage controlled oscillator 438 is digital data encoded as frequency modulation of the voltage controlled oscillator 438 output frequency. This signal is sent through a buffer amplifier 420 and a step-up transformer 422 to the piezoelectric transmitter 430, where the information is transmitted on ultrasonic carrier 444.

Although the preferred embodiment has been described in detail, it should be understood that various changes, substitutions and alterations can be made therein without departing from the spirit and scope of the invention as defined by the appended claims.

What is claimed is:

1. A flow control system for controlling air flow through the ducts of an HVAC system having at least one efferent end for expelling air into a room, comprising:
  a flow control device interfaced with at least one of the HVAC ducts, said flow control device operable to control the flow of air therethrough in response to flow control signals;
  a flow control command device disposed in the vicinity of said one efferent end of the HVAC duct for generating flow control commands;
  an ultrasonic transmitter coupled to said flow control command device, wherein said transmitter is operable to generate and transmit an ultrasonic carrier modulated with said flow control commands to said flow control device through the HVAC duct;
  an ultrasonic receiver for receiving said ultrasonic carrier modulated with said flow control commands and extracting said flow control commands therefrom; and
  a control system for converting said flow control commands to said flow control signals for transfer to said flow control device to control the operation thereof.

2. The system of claim 1 wherein said ultrasonic receiver and said control system are disposed proximate to said flow control device.

3. The system of claim 1 wherein said control system comprises:
  a remotely disposed, relative to said flow control device, central control system for interpreting and analyzing said flow control commands received by said ultrasonic receiver in accordance with a control program and generating flow control signals to control said flow control device in response to receipt of said flow control commands by said ultrasonic receiver; and
  a communications link connecting said flow control device to said central control system for transferring said flow control signals.

4. The system of claim 3 wherein said communications link transmits said flow control signals to said flow control device via an ultrasonic carrier.

5. The system of claim 3 wherein said flow control command device operates as a transceiver so that it may also receive information from said central control system.

6. The system of claim 5 wherein said flow control command device operates in response to polling by said central control system.

7. The system of claim 3 wherein said ultrasonic receiver is disposed proximate to a central location in the plenum of the HVAC system.

8. The system of claim 1 wherein said flow control command device is a thermostat.

9. The system of claim 1 wherein said flow control command device is movable relative to the said efferent end.

10. The system of claim 1 wherein said ultrasonic carrier comprises an ultrasonic frequency and said ultrasonic transmitter comprises an ultrasonic generator for generating said ultrasonic frequency and said ultrasonic transmitter sweeps said ultrasonic frequency output by said ultrasonic frequency generator over a wide range of frequencies, increasing or decreasing from a center ultrasonic frequency, add wherein said flow control commands are digital signals with either a logic "1" or a logic "0" state with the direction of frequency change in one direction indicating a logic "1" and a frequency change in another direction indicating a logic "0" such that a loss of said ultrasonic carrier at any one specific frequency may be ignored when extracting said flow control commands from said ultrasonic carrier by said ultrasonic receiver.

11. The system of claim 1 wherein a frequency change indicates a change in logic state of said digital signals.

12. The system of claim 1 wherein said ultrasonic receiver for receiving said ultrasonic carrier comprises a phase-locked loop for extracting said flow control commands from said ultrasonic carrier.

13. A flow control system for controlling air flow through a plurality of ducts of an HVAC system, each having at least one efferent end for expelling air into a room, comprising:
- a plurality of flow control devices, each interfaced with a selected one of the HVAC ducts, said flow control devices operable to control the flow of air therethrough in response to flow control signals;
- a plurality of flow control command devices, each disposed in the vicinity of an efferent end of one of the selected HVAC ducts for generating flow control commands;
- an ultrasonic transmitter coupled to each said flow control command device, wherein said ultrasonic transmitter is operable to generate and transmit an ultrasonic carder modulated with said flow control commands to said flow control device through the associated HVAC duct;
- a plurality of ultrasonic receivers, each associated with one of the HVAC ducts and operable to receive said associated ultrasonic carrier modulated with said flow control commands, each of said receives for extracting said flow control commands therefrom; and
- a control system for convening said extracted flow control commands to said flow control signals for transfer to said flow control device to control the operation thereof.

14. A flow control system for controlling air flow through the ducts of an HVAC system having at least one efferent end for expelling air into a room, comprising:
- a flow control device interfaced with at least one of the HVAC ducts, said flow control device operable to control the flow of air therethrough in response to flow control signals;
- a flow control command device disposed proximate to said one efferent end of the HVAC duct for generating flow control commands;
- a wireless transmitter coupled to said flow control command device, wherein said transmitter is operable to generate and transmit a signal containing said flow control commands received from said flow control command device;
- a wireless receiver and ultrasonic transmitter disposed in the vicinity of said efferent end of the HVAC duct wherein said receiver is operable to receive said signal from said wireless transmitter and wherein said ultrasonic transmitter is operable to transmit an ultrasonic carrier modulated with said flow control commands received from said wireless transmitter to said flow control device through the HVAC duct;
- an ultrasonic receiver disposed within the HVAC duct for receiving said ultrasonic carrier modulated with said flow control commands and extracting said flow control commands therefrom; and
- a control system for converting said flow control commands to said flow control signals for transfer to said flow control device to control the operation thereof.

15. A flow control system for controlling air flow through the ducts of an HVAC system having at least one efferent end for expelling air into a room, comprising:
- a flow control device interfaced with at least one of the HVAC ducts, said flow control device operable to control the flow of air therethrough in response to flow control signals;
- a flow control command device disposed proximate to said one efferent end of the HVAC duct for generating flow control commands;
- a pressure wave transmitter coupled to said flow control command device, wherein said transmitter is operable to generate and transmit a pressure wave carrier modulated with said flow control commands to said flow control device through the HVAC duct;
- a pressure wave receiver for receiving said pressure wave carrier modulated with said flow control commands and extracting said flow control commands therefrom; and
- a control system for convening said flow control commands to said flow control signals for transfer to said flow control device to control the operation thereof.

16. A method for controlling air flow through the ducts of an HVAC system having at least one efferent end for expelling air into a room, comprising the steps of:
- controlling the air flow through the HVAC ducts in response to flow control signals using a flow control device interfaced with at least one of the HVAC ducts;
- generating flow control commands proximate to the one efferent end of the HVAC duct using a flow control command device;
- transmitting the flow control commands via an ultrasonic carrier modulated with the flow control commands through the HVAC duct;
- receiving the ultrasonic carrier modulated with the flow control commands by an ultrasonic receiver and extracting the flow control commands therefrom; and
- convening the flow control commands to flow control signals to be used in the step of controlling.

17. The method of claim 16 wherein the step of convening comprises:
- transferring the flow control commands to a remotely disposed central control system;
- interpreting and analyzing the flow control commands in accordance with a control program;
- generating flow control signals in response to receipt of the flow control commands; and
- communicating the flow control signals to the flow control device for controlling the air flow in the step of controlling.

18. The method of claim 17 wherein the step of communicating comprises transmitting the flow control signals to the flow control device via an ultrasonic carrier.

19. The method of claim 17 wherein the flow control command device operates as a transceiver so that it may also receive information.

20. The method of claim 17 wherein the ultrasonic carrier is disposed proximate to a central location in the plenum of the HVAC system.

21. The method of claim 16 wherein the flow control command device is a thermostat.

22. The method of claim 16 wherein the flow control command device is movable relative to the efferent end.

23. The method of claim 16 wherein the ultrasonic carrier comprises an ultrasonic frequency which is swept over a wide range of frequencies, increasing or decreasing from a center ultrasonic frequency, and wherein the flow control commands are digital signals with either a logic "1" or a logic "0" state with the direction of frequency change in one direction indicating a logic "1" and a frequency change in another direction indicating a logic "0" such that a loss of the ultrasonic carrier at any one specific frequency may be ignored when extracting the flow control commands from the ultrasonic carrier.

24. The method of claim 16 wherein a frequency change indicates a change in logic state of said digital signals.

25. The method of claim 16 wherein the ultrasonic receiver for receiving the ultrasonic carrier comprises a phase-locked loop (PLL) for extracting the flow control commands from the ultrasonic carrier.

26. A method for controlling air flow through a plurality of ducts of an HVAC system, each having at least one efferent end for expelling air into a room, comprising the steps of:
controlling the air flow through the ducts in response to flow control signals using flow control devices interfaced with each of said HVAC ducts;
generating flow control commands proximate to each efferent end of the HVAC ducts using flow control command devices;
transmitting the flow control commands via an ultrasonic carrier modulated with the flow control commands through the HVAC ducts;
receiving the ultrasonic carrier modulated with the flow control commands by ultrasonic receivers and extracting the flow control commands therefrom; and
converting the flow control commands to flow control signals to be used in the step of controlling.

27. A method for controlling air flow through the ducts of an HVAC system having at least one efferent end for expelling air into a room, comprising the steps of:
controlling the air flow through the ducts in response to flow control signals using a flow control device interfaced with at least one of said HVAC ducts;
generating flow control commands proximate to the one efferent end of the HVAC duct using a flow control command device;
transmitting the flow control commands via a wireless signal containing the flow control commands;
receiving the wireless signal containing the flow control commands;
re-transmitting the flow control commands via an ultrasonic carrier modulated with the flow control commands through the HVAC duct;
receiving the ultrasonic carrier modulated with the flow control commands by an ultrasonic receiver and extracting the flow control commands therefrom; and
converting the flow control commands to flow control signals to be used in the step of controlling.

28. A method for controlling air flow through the ducts of an HVAC system having at least one efferent end for expelling air into a room, comprising the steps of:
controlling the air flow through the HVAC ducts in response to flow control signals using a flow control device interfaced with at least one of the HVAC ducts;
generating flow control commands proximate to the one efferent end of the HVAC duct using a flow control command device;
transmitting the flow control commands via a pressure wave carrier modulated with the flow control commands through the HVAC duct;
receiving the pressure wave carrier modulated with the flow control commands by a pressure wave receiver and extracting the flow control commands therefrom; and
converting the flow control commands to flow control signals to be used in the step of controlling.

* * * * *

UNITED STATES PATENT AND TRADEMARK OFFICE
CERTIFICATE OF CORRECTION

PATENT NO. : 5,449,112

DATED : September 12, 1995

INVENTOR(S) : Heitman et al.

It is certified that error appears in the above-identified patent and that said Letters Patent is hereby corrected as shown below:

Claim 10, column 14, line 60, delete "add", and insert therefor --and--;

Claim 17, column 16, lines 46 and 47, delete "convening", and insert therefor --converting--.

Signed and Sealed this

Sixteenth Day of December, 1997

*Attest:*

BRUCE LEHMAN

*Attesting Officer*   Commissioner of Patents and Trademarks